(12) United States Patent
Kenney

(10) Patent No.: US 6,257,620 B1
(45) Date of Patent: Jul. 10, 2001

(54) HIGH EFFICIENCY SKI FOR SAILING ON SNOW OR ICE

(76) Inventor: Bernard Carroll Kenney, 831 Costigan Court, Saskatoon, SK (CA), S7J 3R4

( * ) Notice: Subject to any disclaimer, the term of this patent is extended or adjusted under 35 U.S.C. 154(b) by 0 days.

(21) Appl. No.: 09/511,293

(22) Filed: Feb. 23, 2000

(51) Int. Cl.⁷ .................................................. A63C 11/00
(52) U.S. Cl. ............................. 280/810; 280/28; 114/43
(58) Field of Search ............................. 280/609, 28, 602, 280/608, 610, 810, 845, 14.21, 28.14; 114/43; 441/68, 74

(56) References Cited

U.S. PATENT DOCUMENTS

| 3,394,944 | * | 7/1968 | Lowes . |
| 3,739,458 | * | 6/1973 | Reddy et al. ........................... 280/28 |
| 4,458,859 | * | 7/1984 | Ganev . |
| 4,585,249 | * | 4/1986 | Plenk .................................. 280/609 |
| 4,601,488 | * | 7/1986 | Jarrett ................................ 280/608 X |
| 4,679,516 | * | 7/1987 | Friesen . |
| 5,277,141 | * | 1/1994 | Csepregi ........................... 280/28 X |
| 5,451,078 | * | 9/1995 | Ohata . |
| 5,931,504 | * | 8/1999 | Armitage . |

FOREIGN PATENT DOCUMENTS

| 3303194 | * | 8/1983 | (DE) . |
| 3232256 | * | 3/1984 | (DE) . |
| 3402474 | * | 8/1984 | (DE) . |
| 3309502 | * | 9/1984 | (DE) . |
| 3528969 | * | 8/1985 | (DE) . |
| 3612775 | * | 10/1987 | (DE) . |
| 3629302 | * | 3/1988 | (DE) . |
| 110798 | * | 6/1984 | (EP) . |
| 420774 | * | 4/1991 | (EP) . |
| 2559449 | * | 8/1985 | (FR) . |
| 2647409 | * | 11/1990 | (FR) . |
| 2653404 | * | 4/1991 | (FR) . |
| 2225760 | * | 6/1990 | (GB) . |
| 2249758 | * | 5/1992 | (GB) . |
| 2000832 | * | 10/1993 | (RU) . |
| 90/09818 | * | 9/1990 | (WO) . |

* cited by examiner

Primary Examiner—Brian L. Johnson
Assistant Examiner—Bryan Fischmann

(57) ABSTRACT

A ski is disclosed for efficiently sailing on snow or ice. The ski has greater thickness than a conventional downhill ski. The substantially triangular shape of the cross-section of the ski is longitudinally constant so as to generate simultaneously both lift and lateral forces with minimum drag. The surface of the ski in contact with the snow or ice is made from or treated with a low friction material. The ski has a longitudinally upward concave curvature to facilitate turning. The ski tip is formed with deadrise like the bow of a boat or, in the alternative, may be a thin shovel like the tip of a conventional ski. The ski incorporates an edge or blade extending downwardly below the central part of the ski to enhance the lateral to drag force ratio on ice.

15 Claims, 3 Drawing Sheets

*Fig. 1 Perspective view of sailing ski*

HIGH EFFICIENCY SKI FOR SAILING ON SNOW OR ICE

BACKGROUND OF THE INVENTION

This invention relates to sailing on snow and ice, and in particular, a ski that efficiently utilizes wind energy for propulsion on snow or ice.

On a hypothetically frictionless surface, the wind blows sailing craft (and all other objects) straight downwind with a speed equal to the wind speed. No other course or speed is possible. In the real world, sailing either upwind or across the wind requires reacting the force generated by the wind on the sail against a surface medium such as land, water, snow or ice. One measure of sailing efficiency is the Foehn number, defined herein as the speed of the sailing craft relative to the speed of the wind. Sailing efficiency increases as the ratio of the lateral force to the drag force of the sailing craft increases, where the lateral force is defined as the force generated by the reaction of sailing craft on the surface medium perpendicular to the direction of travel and the drag force is defined as the resistance in the direction of travel. Hyperwind sailing at Foehn 3 (that is, sailing at three times faster than the wind speed) is readily achieved on sharpened metal blades that are capable of very high lateral/drag force ratios when sliding on smooth ice.

Sailing craft designed to sail on snow have been less successful because of the severe demands required of a sailing ski. The ski must provide vertical lift to support the combined weight of the sailor(s), ski(s) and rig. The ski must also generate the necessary lateral force to counteract the sail forces. In order to achieve high Foehn numbers, the ski must accomplish both tasks with minimum drag in the direction of travel.

Specialized sailboards, monoskis, snowboards as well as iceboats and other boards fitted with a plurality of skis have been invented for sailing on snow or ice but are deficient to varying degrees in performance, stability or control. Iceboats fitted with a plurality of conventional downhill skis for sailing on snow are so inferior in performance to blades on ice that they seldom exceed Foehn 1 and often cannot turn through the eye of the wind without coming to a stop. Inadequate lateral resistance inherent in some of these designs can be dangerous when it results in sudden and unpredictable spinout at high speed.

Many of these inadequacies may be attributed to the use of conventional downhill skis for purposes for which they were not designed. Downhill skis are elongated planar structures that are designed to provide the vertical lift required to support the weight of a skier in snow while simultaneously minimizing the drag opposing the skier's motion. Unlike sailing craft that require a continuous lateral force or side load to balance sail force, downhill skis often support little or no side load even when turning. The lateral force required for skiing across the fall line is achieved by edging or tilting the skis uphill about their longitudinal axes with the legs or ankles. A turn is initiated by tilting the skis into the direction of the turn. The turning radius is controlled by a complex interaction of ski camber, ski flex and sidecut. Because the tip and the tail of the ski provide more grip on the snow than the center that is cut away, the ski bends into a curve that facilitates turning. Skis with more flex and more sidecut have shorter turning radii. Sidecut is detrimental when travelling in a straight line, however, because skis with greater turning ability produce higher drag.

U.S. Pat. No. 5,451,078 and WO9408670 both describe mechanisms for attaching an articulating sailboard sail to the front of a pair of downhill skis. In both inventions, the skis are worn using conventional ski boots. Lateral force is generated by simultaneously tilting both skis to counteract the sail force. Although each ski operates as designed for skiing across the fall line, the drag is higher than optimum because of the sidecut. This configuration is also uncomfortable because it requires the sailor's feet to be aligned in the direction of travel while the upper body is twisted almost 90 degrees to hold the sail. It may also be unstable and dangerous in the event of a fall because the sail attachments impose additional constraints on the relative motion of the skier's feet.

U.S. Pat. No. 4,601,488 and U.S. 5,931,504 disclose two monoski configurations utilizing a sailboard sail attached to the front of a single ski. In these inventions, lateral force is also generated by tilting the ski opposite to the sail force. The monoski configuration may be more comfortable on a reach because the sailor stands with feet pointed across the direction of travel. With only one ski, performance may be enhanced while stability, control and safety problems are exacerbated. In general, monoskis must stop to change direction.

Numerous other attempts have been made to sail on conventional skis and snowboards with a variety of add-on keels, blades or fins. Patent EP0110798 discloses a snowboard with an central rib like an integral keel used in a similar configuration to a monoski. Patent DE3036503 describes a sailboard with rear mounted fins that is also sailed like a monoski. Although probably more stable than a monoski, these inventions likely produce higher drag.

Other configurations have been disclosed that use pairs of downhill skis in a fixed orientation. Patent FR2610837 describes two skis rigidly attached to a central platform that uses an articulating sail. U.S. Pat. No. D 281769 describes a 3-ski (iceboat) configuration using a pair of fixed parallel skis with one central steering ski.

With two rigid skis, lateral force is often generated by fixing one ski with a positive tilt and the second ski with negative tilt of equal magnitude. So oriented, only one ski of each pair effectively produces lateral force while both skis produce drag. The resulting lateral to drag force ratio is poor. The fixed orientation of the skis also inhibits effective turning of the sailing craft because only one ski can flex as designed for skiing. Turning is further inhibited because a conventional downhill ski has both camber and sidecut that causes the tip and tail to dig into the snow and ice when turning.

BRIEF SUMMARY OF THE INVENTION

It is an object of the present invention to provide a high efficiency ski for sailing on snow and ice. The invention comprises a ski with a minimum resistance in the direction of travel, maximum resistance to slippage in the lateral or cross-travel direction and sufficient lift in the vertical direction to support the weight of the sailor and sailing apparatus. A high lateral/drag force ratio is achieved by the shape of the ski, using a ski with greater thickness than a conventional downhill ski. In a preferred embodiment the cross-section of the ski is triangular and the shape is longitudinally constant. Other substantially triangular shapes that optimize lateral/drag ratios fall within the scope of this patent. The surface of the ski in contact with the ice and snow is made from or treated with a low friction material. To facilitate turning, the ski is curved longitudinally in the opposite sense to the camber of a conventional alpine ski. The lower sliding surface rises both forwardly and rearwardly from the center of the ski. The tip can be a thin shovel, like the tip of a conventional alpine ski, or the tip can have a v-shaped bottom like the bow of a boat with deadrise. Deadrise is a marine term defined here as the angle with the horizontal made by the outboard rise of the bottom at any cross-section.

The ski incorporates a sharpened edge or one or a plurality of sharpened blades near the central part of the ski to improve the lateral/drag ratio on ice. The blade(s) can be an integral part of the ski or can be attached separately to the ski. The ski can be constructed of metal, plastic, ceramic or wood or any combination of these materials or any other material with sufficient strength to withstand the loads imposed by sailing at high speeds over rough terrain. The ski can have an internal core like a downhill ski or can be a hollow shell like a boat hull.

The ski can be used as a monoski with either a hand-held or attached sail, or a plurality of skis can be attached to a platform with one or more skis arranged to provide steering. In 3 and 4-ski configurations the steering skis have the same cross-section but are typically half the length of the non-steering skis. The platform can be a board or a deck upon which a sailor stands and controls an articulating sailboard sail using a conventional double-sided boom. The platform can also be a conventional iceboat in which one or a plurality of sailors sit, lie or stand to control one or a plurality of conventional sailboat sails using a system of sheets. The sail employed can also be a kite attached by long lines to the sailor or sailing craft.

The sailing ski disclosed herein ameliorates the performance, stability and control problems described above because the thickness and the shape of the ski are designed specifically to generate lift and lateral forces simultaneously while at the same time minimizing drag.

DETAILED DESCRIPTION OF THE INVENTION

Figure 1:
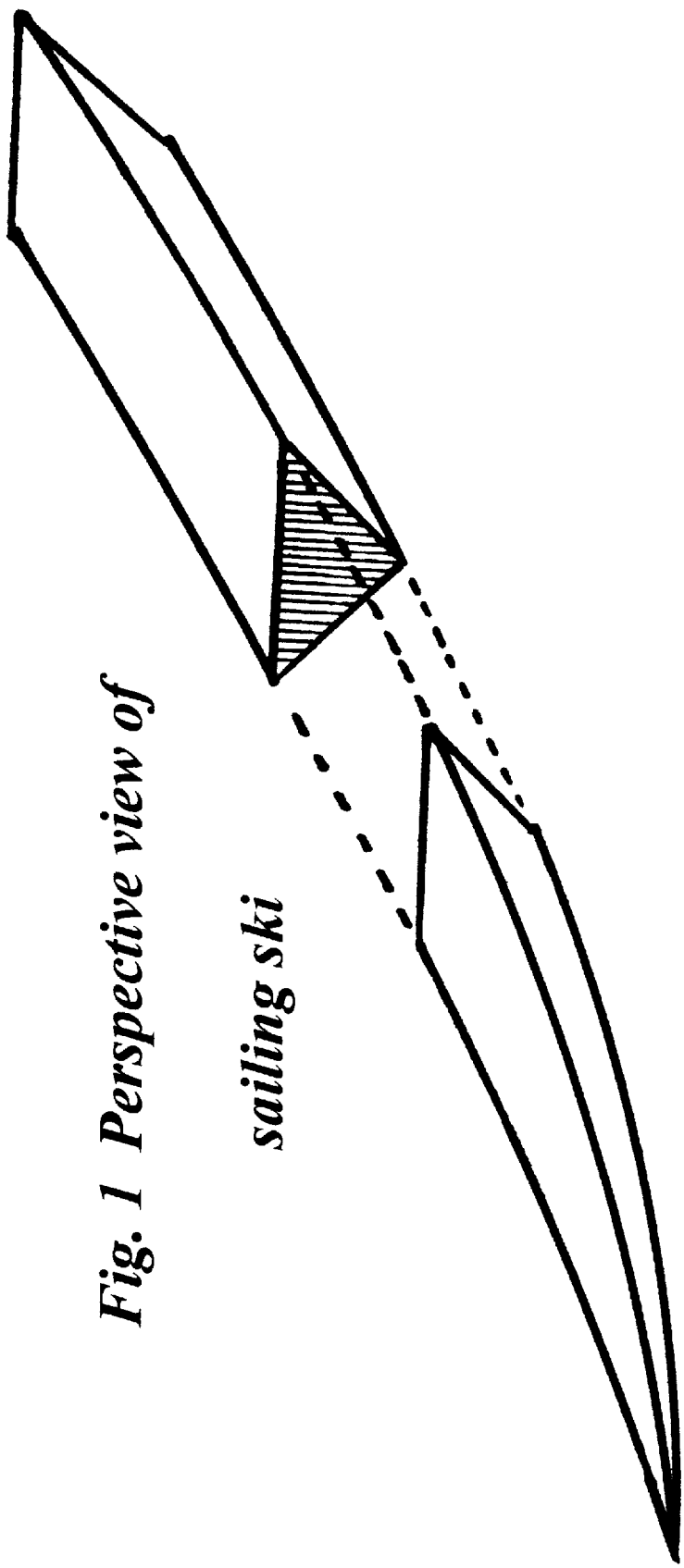
FIG. 1 is a perspective view of the high lateral/drag force ratio ski.

FIG. 1 illustrates a perspective view of the high lateral/drag force ratio ski embodying the invention. The ski has greater thickness than a conventional ski and the bottom is arranged for optimizing lift and lateral forces while simultaneously minimizing drag in the direction of travel. Vertical and lateral force optimization is achieved by using a substantially triangular cross-section with a v-shaped bottom. The bottom apex angle is a design parameter that depends upon the weight and the sail area of the sailing craft utilizing the ski. The shape of the cross-section is longitudinally constant to minimize drag. The ski is curved concave upwardly along its length to facilitate turning. The length of the ski can be similar to a conventional downhill ski as determined by load requirements. A ski used for steering can be less that half the length of the main load bearing skis.

Figure 2:
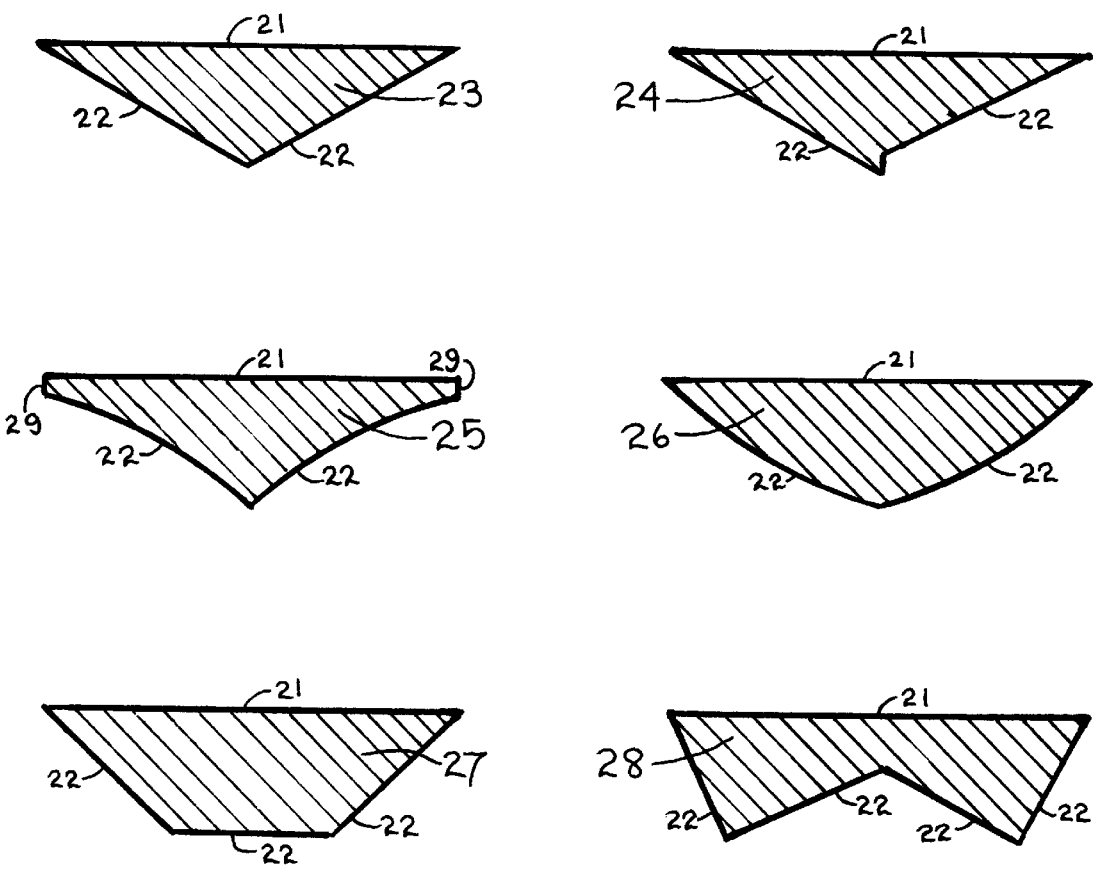
FIG. 2 shows alternative embodiments for the cross-sectional shape of the ski.

Referring to FIG. 2, the ski has an upper surface (21) and a lower surface (22). In the preferred embodiment the cross-sectional shape of the ski is substantially triangular (23) and can have one plane of symmetry. In an alternative embodiment, the cross-sectional shape of the ski is asymmetrical about a vertical plane extending through the bottom apex (24) to provide a downwardly extending edge for lateral resistance on ice. In other alternative embodiments, the bottom surface can be transversely convex (26) or concave (25) and can have sidewalls (29) connecting the upper and lower surfaces. The cross-sectional shape can also be truncated into a trapezoid (27). In another alternative embodiment comprised of conjoined triangles, the bottom surface is w-shaped (28). For all cross-sectional shapes, both upper and lower surfaces can be convoluted by longitudinally extending ribs or flutes when required for performance, stability or control.

Figure 3:
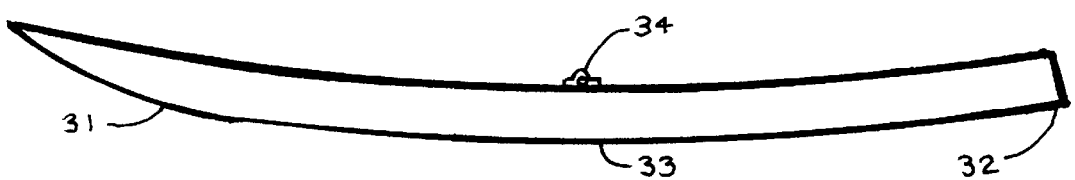
FIG. 3 is a side elevation view of the ski illustrating longitudinal curvature and attachment means.

FIG. 3 is a side elevation view illustrating that the ski is not cambered like a conventional ski but is curved upwardly concave. The bottom of the ski rises forwardly from the center (33) to the tip (31) and rearwardly from the center to the tail (32) to facilitate turning. The magnitude and longitudinal distribution of curvature is determined empirically to optimize performance or handling for a particular application. An increase in longitudinal curvature improves the handling and degrades the performance. There is higher curvature near the tip to ensure the ski rises over bumps and obstructions on the snow or ice. The tip of the ski maintains its deadrise as it tapers towards a point like the bow of a simple boat. Aft of the tip section, the shape of the cross-section of the ski is constant in the preferred embodiment.

The deadrise is a design parameter that can vary as required to optimize the lateral/drag force ratio for differences in weight and sail area or to optimize stability or control in a particular application. In the alternative, the tip can be a thin shovel extending forwardly and upwardly from the front of the constant cross-section, like the tip of a conventional downhill ski.

The attachment means (34), illustrated in FIG. 3, can be fixed or can be a conventional mechanical mechanism with 1 or more degrees of freedom as readily determined by those skilled in the art. Rotational freedom in pitch that can be provided by a pair of simple pillow blocks (34) improves the ride. Rotational freedom in yaw enables steering control.

Figure 4:
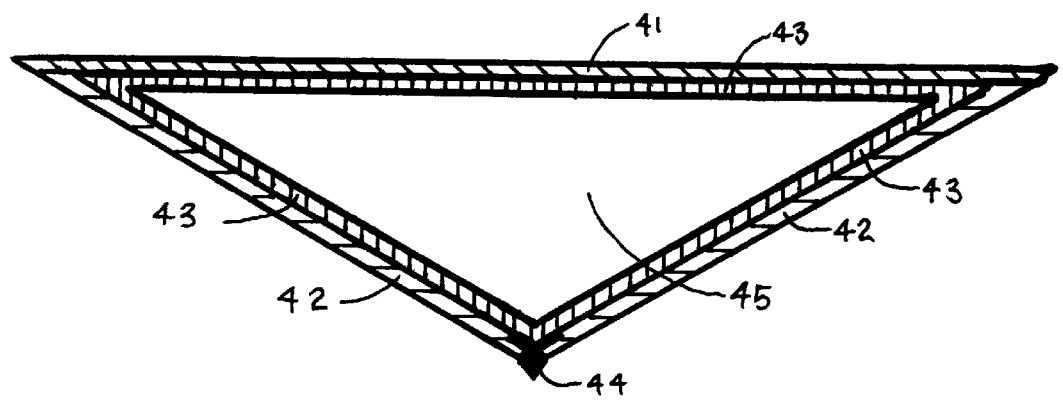
FIG. 4 is a cross-sectional view illustrating a preferred embodiment of the ski with triangular cross-section constructed using conventional ski technology.

FIG. 4 is a cross-sectional view illustrating a preferred embodiment of the ski with triangular cross-section constructed with conventional ski technology. The ski includes a top layer (41), a bottom sliding layer or base (42), a structural layer (43), a hard running edge (44) and a core (45). The top layer is a decorative and protective layer, preferably made from transparent thermoplastic with graphics and trade names printed on the underside. The base (42) is made from a low friction material such as ultra high molecular weight polyethylene available under the trade name P-Tex. The structural layer (43) can be a fiber-reinforced thermoplastic or thermoset or can be metal or other material with sufficient strength. The running edge (44) is usually made from hardened steel. The core (45) can be hollow or can be made from wood, plastic or foam. The integral bottom edge (44) is sharpened, either symmetrically or asymmetrically depending upon the application, to provide lateral resistance on ice. In the alternative, the ski can have attachment means to a conventional iceboat runner or blade.

Figure 5:
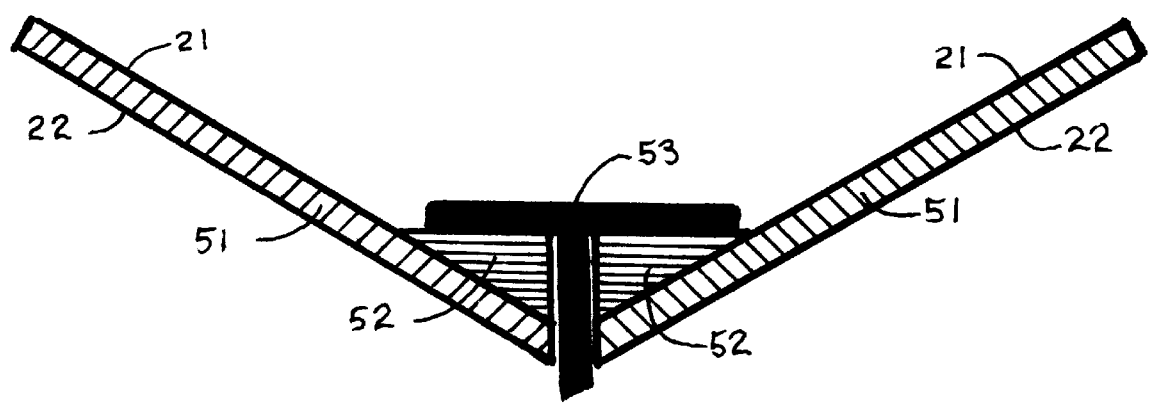
FIG. 5 is a cross-sectional view illustrating a contoured or shell ski with attachment means to a conventional iceboat runner.

Referring to FIG. 5, and in the alternative to FIG. 2, the upper surface (21) is not plane but generally follows the lower surface (22) to provide a contoured or shell ski, like the hull of an open boat. FIG. 5 is a cross-sectional view illustrating a preferred embodiment of a contoured ski constructed with contemporary industrial technology. The shell (51) of the ski is fabricated from reinforced plastic composite, sheet metal or other material with sufficiently high strength to weight ratio. The lower surface (22) is covered with a low friction coating such as teflon or, in the alternative, has a low friction layer bonded to it. The ski has a longitudinally extending slot with attachment means (52) to a conventional iceboat runner (53) or sharpened blade. In the alternative, the contoured ski can have an integral running edge.

Variations to the present invention by others skilled in the art to which the invention applies is an infringement of this invention when the variations fall within the scope of the appended claims.

What is claimed is:

1. A sailing ski comprising:

an upper surface and a lower surface and having greater thickness than a conventional downhill ski, said lower surface is made from or coated with a low friction material, the cross-section of said ski is substantially triangular and the shape of the cross-section is longitudinally constant, the bottom apex of said triangular cross-section has an included angle of 120 degrees +/−40 degrees, the precise value of said angle depending upon the design weight and sail area of the sailing craft and the relative magnitude of the lift and lateral forces required, said ski is not cambered longitudinally but is curved along its length in the opposite sense, upwardly concave, said ski has at least one longitudinal edge or blade extending downwardly near the longitudinal center of said ski, said ski has means for attaching to a platform, sailboard, iceboat or sailing craft.

2. A ski as in claim 1 wherein:

at least one apex of said triangular shape is truncated.

3. A ski as in claim 1 wherein:

the size of the cross-section is longitudinally constant except near the tip.

4. A ski as in claim 3 wherein:

at least one apex of said triangular shape is truncated.

5. A sailing ski comprising:

an upper surface and a lower surface and having greater thickness than a conventional downhill ski, said lower surface is made from or coated with a low friction material, said lower surface is v-shaped in cross-section consisting of a port segment and a starboard segment with equal deadrise, said deadrise of said lower surface is longitudinally constant, said ski is not cambered longitudinally but is curved along its length in the opposite sense, upwardly concave, said ski has at least one longitudinal edge or blade extending downwardly near the longitudinal center of said ski, said ski has means for attaching to a platform, sailboard, iceboat or sailing craft.

6. A ski as in claim 5 wherein:

said longitudinal curvature increases near the tip and said lower surface tapers towards a point at said tip.

7. A ski as in claim 6 wherein:

said deadrise of said ski varies longitudinally near said tip as the lower surface tapers towards a point at said tip.

8. A ski as in claim 5 wherein:

said ski is truncated near the tip and the ski tip is of the form of a thin shovel.

9. A ski as in claim 5 wherein:

said lower surface is asymmetrical in cross-section with different deadrise angles to port and starboard.

10. A ski as in claim 5 wherein:

said lower surface is substantially v-shaped in cross-section and at least one of the segments of said lower surface is transversely curved.

11. A ski as in claim 10 wherein:

said lower surface is asymmetrical in cross-section with different deadrise angles to port and starboard.

12. A sailing ski comprising:

an upper surface and a lower surface and having greater thickness than a conventional downhill ski, said lower surface is made from or coated with a low friction material, the shape of said cross-section of said ski is comprised of conjoined triangles and, except near the tip, the shape and the size of the cross-section are longitudinally constant, said ski is not cambered but is curved along its length in the opposite sense, upwardly concave, said ski has at least one longitudinal edge or blade extending downwardly near the longitudinal center of said ski, said ski has means for attaching to a platform, sailboard, iceboat or sailing craft.

13. A ski as in claim 12 wherein:

said tip of said ski is of the form of a thin shovel and is curved longitudinally.

14. A ski as in claim 12 wherein:

at least one apex of said conjoined triangular shape is truncated.

15. A ski as in claim 12 wherein:

said lower surface is substantially w-shaped in cross-section and at least one of the segments of said lower surface is transversely curved.

* * * * *